((12)) United States Patent
Bucher et al.

(10) Patent No.: US 7,338,402 B2
(45) Date of Patent: Mar. 4, 2008

(54) DEVICE FOR CONTROLLING AN AUTOMATIC TRANSMISSION

(75) Inventors: Adolf Bucher, Kressbronn (DE); Anton Fritzer, Markdorf (DE); Tobias Pfleger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 234 days.

(21) Appl. No.: 10/556,348

(22) PCT Filed: May 7, 2004

(86) PCT No.: PCT/EP2004/004860

§ 371 (c)(1),
(2), (4) Date: Dec. 20, 2005

(87) PCT Pub. No.: WO2004/102042

PCT Pub. Date: Nov. 25, 2004

(65) Prior Publication Data

US 2007/0105681 A1    May 10, 2007

(30) Foreign Application Priority Data

May 14, 2003    (DE)    ................. 103 21 530

(51) Int. Cl.
*F16H 31/00*    (2006.01)
(52) U.S. Cl. ............ 475/120; 475/127; 475/134
(58) Field of Classification Search ........... 475/116, 475/120–122, 127, 134
See application file for complete search history.

(56) References Cited

U.S. PATENT DOCUMENTS

| | | | |
|---|---|---|---|
| 3,695,121 A | 10/1972 | Corrigan et al. | |
| 4,519,273 A | 5/1985 | Shimizu et al. | |
| 5,437,204 A | 8/1995 | Person | |
| 6,030,317 A | 2/2000 | König et al. | |
| 6,110,071 A | 8/2000 | Kozan et al. | |
| 6,319,165 B1* | 11/2001 | Itou et al. | 475/119 |
| 6,508,735 B1 | 1/2003 | Murakami et al. | |
| 6,634,991 B2* | 10/2003 | Itou et al. | 477/156 |
| 6,780,131 B2* | 8/2004 | Itou et al. | 475/127 |
| 2003/0060313 A1 | 3/2003 | Sommer et al. | |

FOREIGN PATENT DOCUMENTS

| | | |
|---|---|---|
| DE | 101 46 962 A1 | 4/2003 |
| WO | WO-97/37158 | 10/1997 |

* cited by examiner

*Primary Examiner*—Ha D. Ho
(74) *Attorney, Agent, or Firm*—Davis Bujold & Daniels, P.L.L.C.

(57) ABSTRACT

A device for the hydraulic control of an automatic transmission, especially a continuously variable automatic transmission. The control system comprises a forward/reverse drive unit (4), which is controlled by way of at least a first and a second shifting component (5, 6). The shifting components (5, 6) are in turn controlled via at least two valves (7, 8, 17, 18, 20, 21), which are pressurized by way of a pressurized medium pump (9). A gear selector device (15) selection is made among at least a forward gear (D), a neutral gear (N) and a reverse gear (R), wherein the selector device (15) possesses a non-mechanical connection to the transmission control system.

7 Claims, 8 Drawing Sheets

DEVICE FOR CONTROLLING AN AUTOMATIC TRANSMISSION

This application is a national stage completion of PCT/EP2004/004860 filed May 7, 2004 which claims priority from German Application Serial No. 103 21 530.1 filed May 14, 2003.

FIELD OF THE INVENTION

The present invention relates to a hydraulic control device for controlling an automatic transmission, especially a continuously variable automatic transmission, with at least a first and a second shifting component.

BACKGROUND OF THE INVENTION

Continuously variable automatic transmissions (CVT) for motor vehicles customarily comprise a start-up unit, a forward and reverse drive unit, a variable speed gear, an intermediate shaft, a differential and a control unit. A CVT is ordinarily driven by an internal combustion engine, via a drive shaft, and possesses a hydraulic start-up element. The forward and reverse drive unit is used to reverse the direction of rotation for forward or reverse motion and is customarily comprised of a planetary reverse-gear mechanism.

The variable speed gear is comprised of two V-pulleys and a belt, wherein each V-pulley comprises a first pulley half that is stationary in an axial direction, and a second pulley half that can be shifted in an axial direction. The belt travels around between these two V-pulleys.

By displacing the V-pulley halves, the radius of rotation of the belt and thus the gear ratio of the transmission can be changed. The second V-pulley is non-rotatably connected to an output shaft that transfers the torque to an intermediate shaft via a pair of toothed gears. The torque from the intermediate shaft is transferred via a second pair of toothed gears to the differential.

The control and/or regulation of the CVT is customarily accomplished by way of a hydraulic control unit. The hydraulic control unit comprises electromagnetic control elements and hydraulic valves. A pump forces a pressurized fluid from a lubricant pan to a hydraulic control unit. In this the electromagnetic control elements are most frequently operated via an electronic transmission control system.

To actuate the forward and reverse drive unit shifting components are customarily used, which can be selected by way of a gear selector device. This gear selector device receives signals from the driver of the vehicle, wherein the driver may select from among the drive gears P, R, N or D, for example. The gear selector device customarily corresponds to a manual gearshift lever, with which the driver transmits the signal to the transmission. This gearshift lever most frequently is mechanically connected to a control unit. By way of this control unit, the valves for loading the shifting elements are then mechanically controlled.

This type of arrangement is described in EP 0 890 046 B1. In that system shifting components are pressurized by way of a hydraulic system. In this, the gear selected by the driver is engaged by way of a so-called selector valve, which corresponds to a hydraulic valve. In this case, the selector lever is mechanically connected directly to the selector valve.

The mechanical control for the selector valve customarily consists of a gearshift control cable, which connects the selector lever to the control unit in the transmission. The control unit is moved, via the gearshift control cable, which causes a mechanical adjustment of the selector valve. Due to the preferred positioning of the control unit on the upper side of the transmission and the positioning of the transmission control unit in the oil pan on the lower side of the transmission, the selector valve is frequently directed in a separate selector valve housing in the direct vicinity of the control unit. From this selector valve housing, a hydraulic connection to the transmission control unit is then necessary. This connection, along with the separate selector valve housing itself, is costly. Furthermore, the hydraulic connection of the selector valve housing to the transmission control unit severely limits the arrangement of the individual transmission components.

The objective of the invention is to improve upon known hydraulic control systems.

The objective is achieved with a hydraulic control device for shifting the gears of an automatic transmission, especially a continuously variable automatic transmission.

SUMMARY OF THE INVENTION

The solution of the invention especially concerns the beneficial arrangement of pressure regulator valves and solenoid valves, which serve to control the valves for loading the shifting components of the forward and reverse drive unit and are connected, via a non-mechanical connection, to a gear selector device.

In the forward/reverse drive unit, various gears are engaged via a number of shifting components. In this process, valves are controlled by way of a number of pressure regulator valves and solenoid valves. These pressure regulator valves and solenoid valves are actuated by way of an electronic transmission control unit. The pressure regulator valves and solenoid valves are supplied with pressurized medium via a hydraulic pressurized medium pump. The output pressure of the pressure regulator valves and solenoid valves is also electronically controlled and, in turn, controls a number of valves. Via these valves, shifting components are then pressurized with compressed medium causing them to engage various gears.

The hydraulic valves that are responsible for selecting the shifting components are no longer mechanically connected to the gear selector device. Instead, they are hydraulically controlled via a number of pressure regulator valves and solenoid valves which, in turn, are electronically controlled via the electronic transmission control unit.

One advantageous embodiment presents a selector lever as the gear selector device, wherein the connection of the selector lever with the transmission control unit is enabled, via a gearshift control cable and a so-called selector shaft, which serves as the control unit. In this, the selector shaft is rotated by way of the gearshift control cable and, in correspondence with the position of the selector shaft, an electronic signal is transmitted to the transmission control unit. The valves are then controlled accordingly to effect a selection of the shifting components.

Thus there is only one non-mechanical connection between the control unit and the transmission control unit. This non-mechanical connection is advantageously represented by an electronic connection between the selector shaft and the transmission control unit.

BRIEF DESCRIPTION OF THE DRAWINGS

The invention will now be described, by way of example, with reference to the accompanying drawings in which.

DETAILED DESCRIPTION OF THE INVENTION

Figure 1:
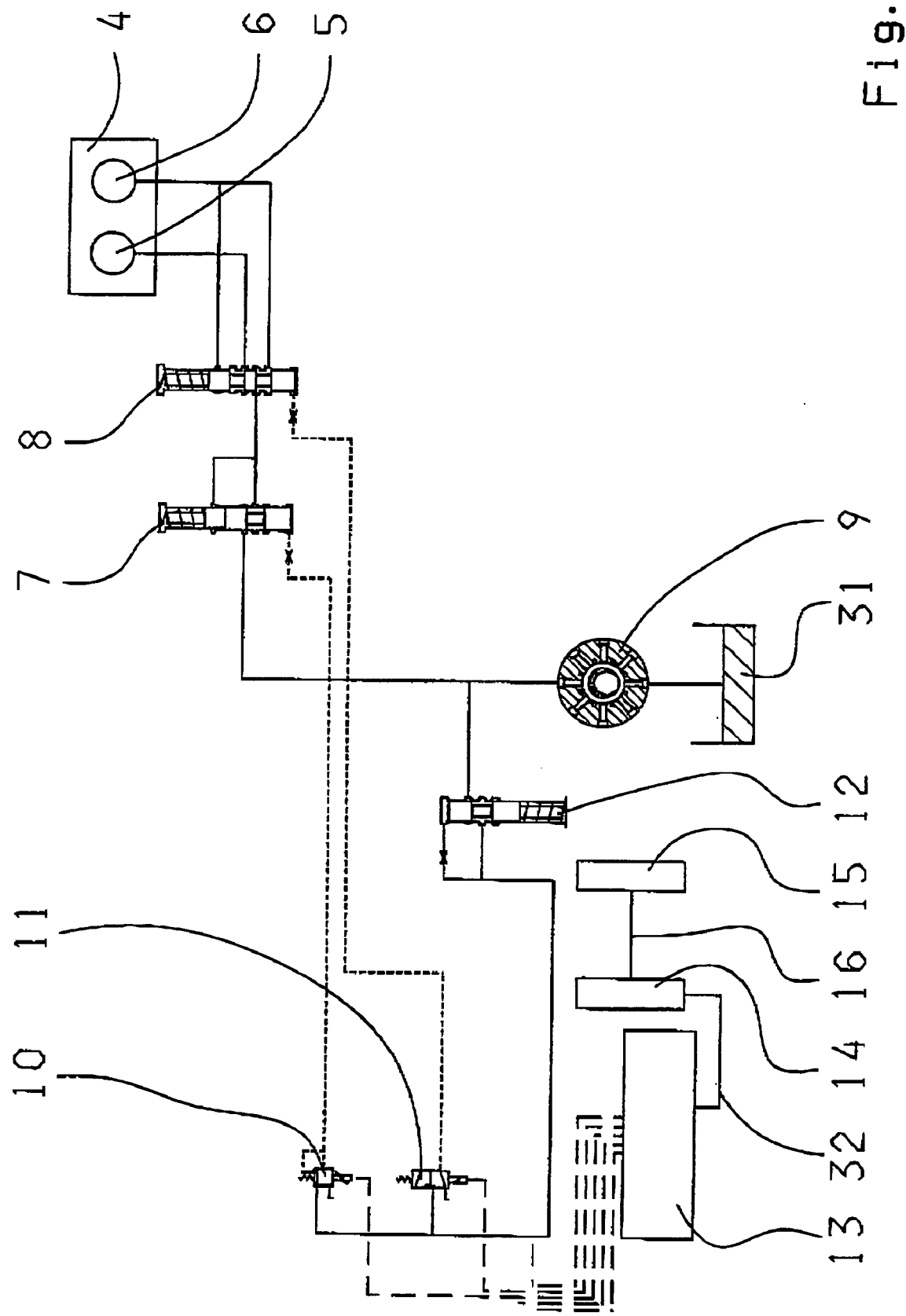
FIG. 1 is a hydraulic control system.

In FIG. 1, a first embodiment of a hydraulic control system, as specified in the invention, is depicted. A pressure circuit contains a forward/reverse drive unit 4. In this, two shifting components 5, 6 are controlled by way of two valves 7, 8 arranged in sequence. The first valve 7 is supplied with system or main pressure directly by a pressurized medium pump 9. Via a first pressure regulator valve 10, the pressure necessary for the selected shifting component 5, 6 is then adjusted at the valve 7. The second valve 8 is used to select which of the shifting components 5, 6 will be pressurized with the pressure that has been adjusted by way of the first valve 7. The shifting element 5, 6 that is not pressurized is evacuated via the second valve 8. The second valve 8 is controlled via a first solenoid valve 11. The first pressure regulator valve 10 and the first solenoid valve 11 are supplied with pressurized medium via the pressurized medium pump 9, via a pressure-reducing valve 12, wherein the pump 9 forces the pressurized medium out of a pressurized medium pan 31. Further, the first pressure regulator valve 10 and the first solenoid valve 11 are triggered via an electronic transmission control unit 13. To accomplish this, a driver transmits a signal via a gear selection device 15 and a mechanical connection 16 to a control unit 14. From the control unit 14, the signal is transmitted to the electronic transmission control unit 13 via an advantageously electronic, non-mechanical connection 32. Thus there is a non-mechanical connection 32 between the control unit 14 and the transmission control unit 13. The first and second valves 7, 8 are only indirectly connected to the control unit 14.

Figure 2:
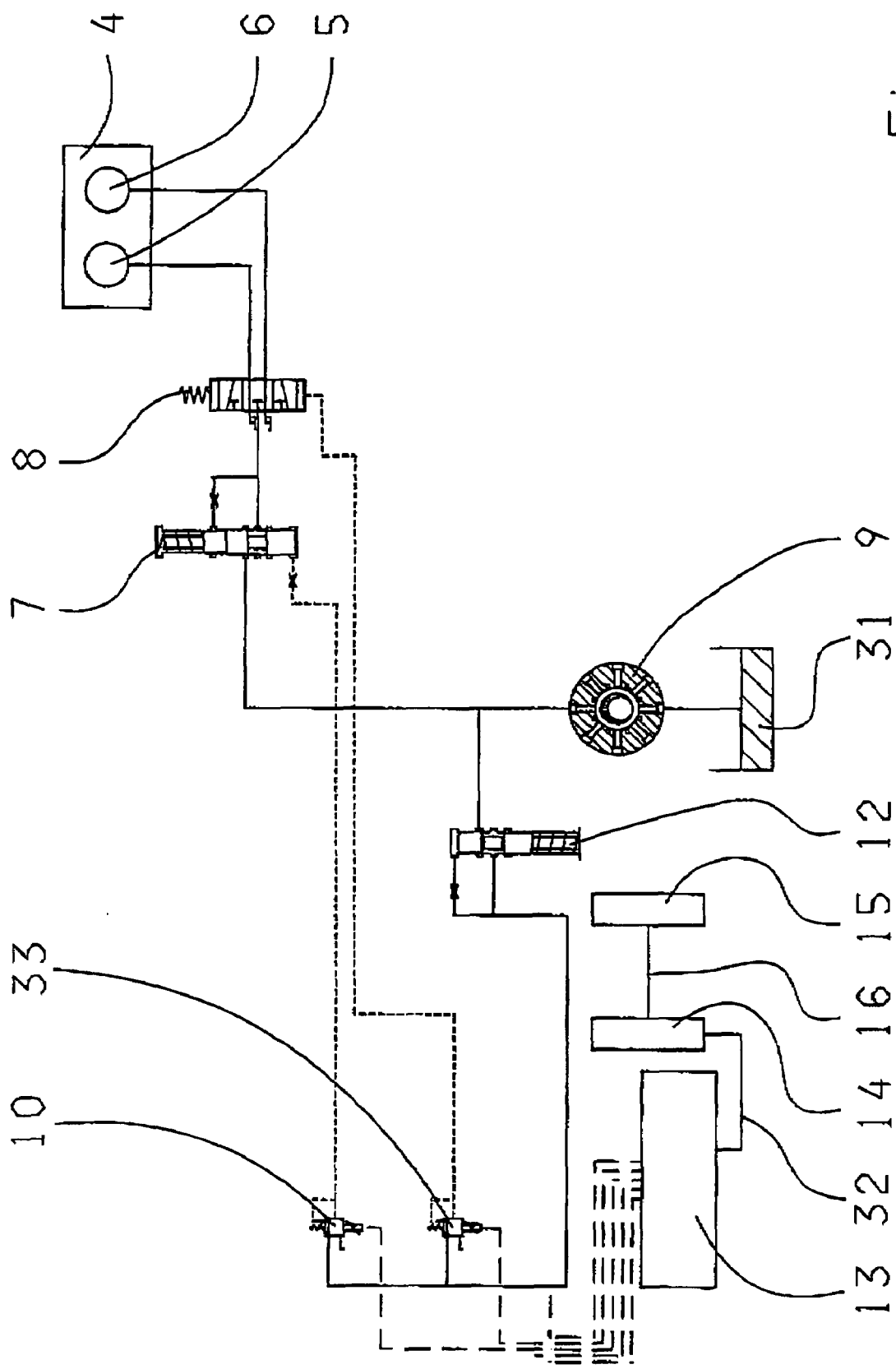
FIG. 2 is a second embodiment of a hydraulic control system.

FIG. 2 presents a second embodiment of a hydraulic control system as specified in the invention. In this variation, as compared with the variation of FIG. 1, the second valve 8 is designed to comprise three stages. With this arrangement, an additional position is enabled in which both shifting components 5, 6 are shifted without pressure and thus are evacuated. For the control of the second valve 8, a second pressure regulator valve 33 is used. With the second valve 8, designed to comprise three stages, the hydraulic control is ensured against simple error.

Figure 3:
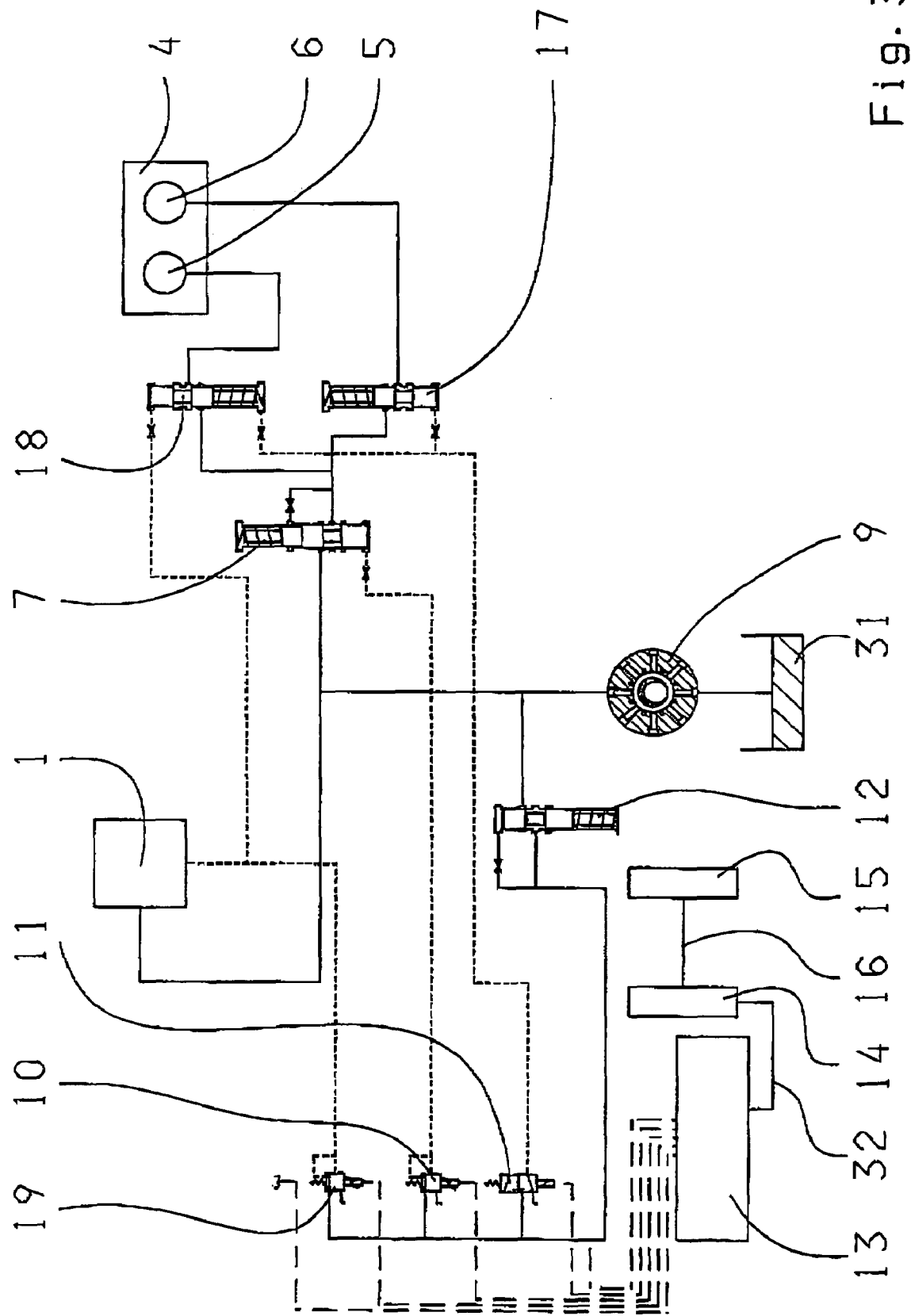
FIG. 3 is a third embodiment of a hydraulic control system.

FIG. 3 presents a further embodiment of a hydraulic control system. In this variant, the pressure with which the shifting components 5, 6 are to be pressurized is again controlled by way of the first valve 7. However in this case, the second valve 8 from FIG. 1 is divided into two individual valves 17, 18. Each valve 17, 18 can be used independently of the other to select whether or not the subsequent shifting component 5, 6 is to be pressurized. In this, both valves 17, 18 are pressurized with the output pressure from the first valve 7. Also, both valves 17, 18 are controlled by the first solenoid valve 11, wherein the third valve 17 is pressurized with the control pressure of the first solenoid valve 11 in the 'open' direction, and the fourth valve 18 is pressurized with the control pressure of the first solenoid valve 11 in the 'closed' direction. Additionally, one of the two valves 17, 18 is linked to a further control pressure. Advantageously, the control pressure of a third pressure regulator valve 19 is used to accomplish this, which also regulates the control pressure for a consumer 1, advantageously for a variable speed gear. When this supplementary control pressure rises to a threshold level to be determined, the fourth valve 18 is closed. With this, control is again ensured against simple error.

Figure 4:
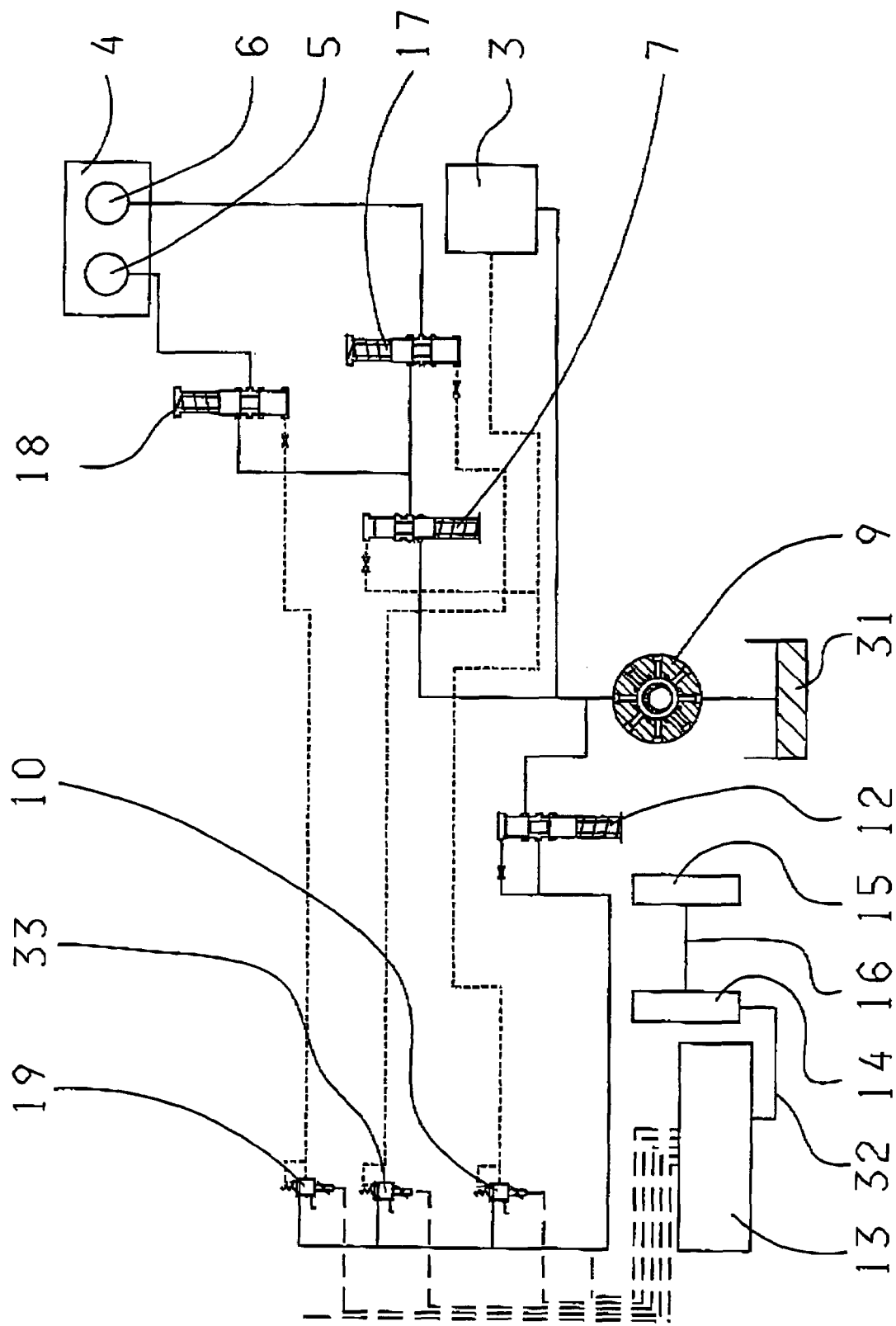
FIG. 4 is a fourth embodiment of a hydraulic control system.

FIG. 4 presents a further embodiment of a hydraulic control system. In this variant, as in FIG. 2, the pressure with which the shifting components 5, 6 are pressurized is controlled via the first valve 7. The second valve 8 from FIG. 3 is divided into two individual valves 17, 18. The valves 17, 18 can be used independently of one another to select whether or not the subsequent shifting element 5, 6 is to be pressurized. Both valves 17, 18 are pressurized with the output pressure of the first valve 7. The third and fourth valves 17, 18 are controlled via a second and a third pressure regulator valve 33, 19. The first valve is controlled via the first pressure regulator valve 10, which advantageously controls a further consumer 3. This consumer 3 advantageously comprises a hydraulic start-up element.

Figure 5:
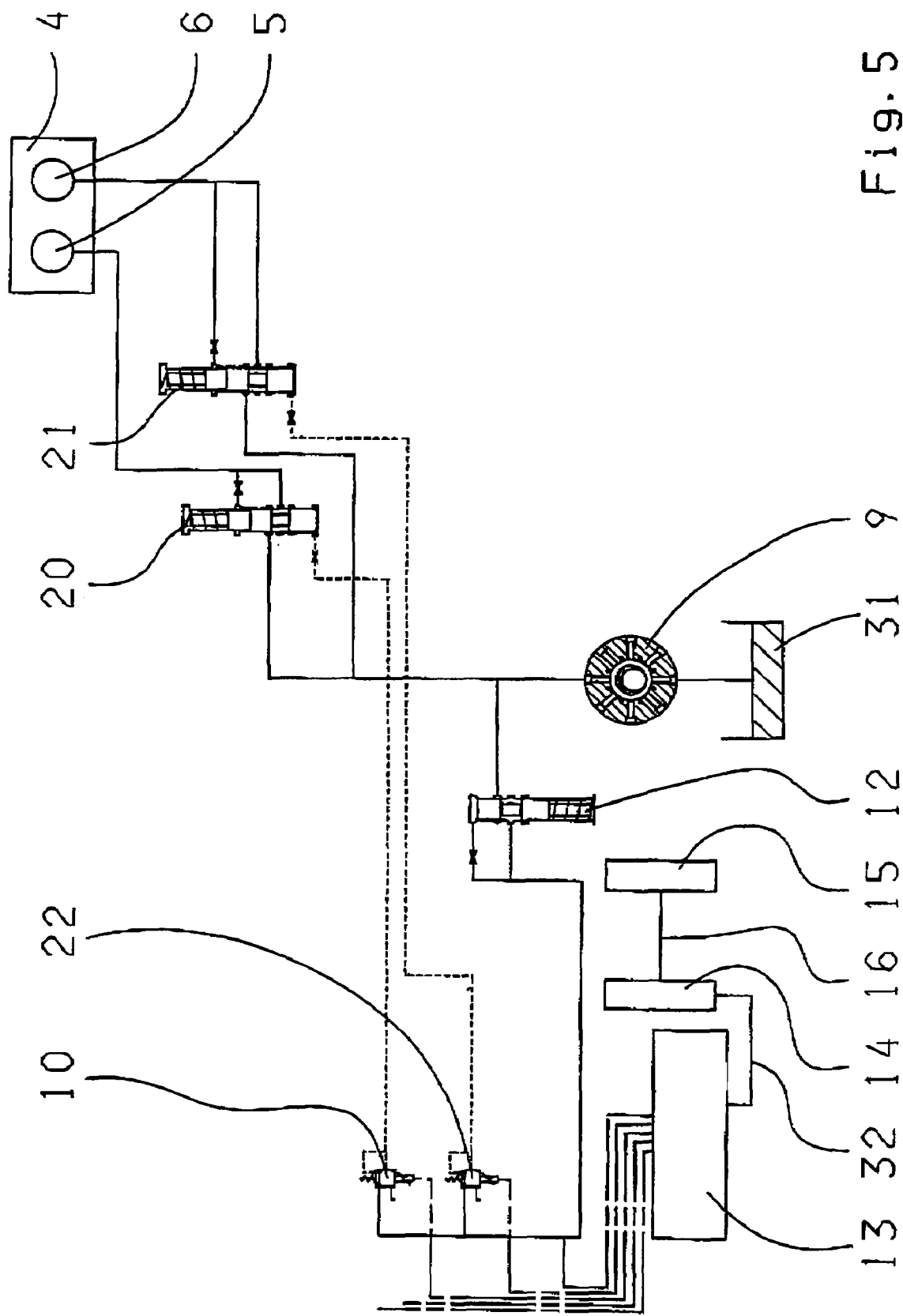
FIG. 5 is a fifth embodiment of a hydraulic control system.

FIG. 5 shows an embodiment of the control system of the invention with fifth and sixth valves 20, 21 that are pressurized directly from the pressurized medium pump 9. In this, the fifth valve 20 is controlled via the first pressure regulator valve 10 and the sixth valve 21 is controlled via a fourth pressure regulator valve 22. Thus both valves 20, 21 are capable of regulating different pressure levels. With this a so-called overlapping shifting is possible, i.e., one of the two shifting components 5, 6 can be loaded while the other shifting component 6, 5 is still being evacuated. In this way, shifting can be accomplished more rapidly and the transition between the gear levels can be smoother than if the fifth and sixth valves 20, 21 are loaded in sequence.

Figure 6:
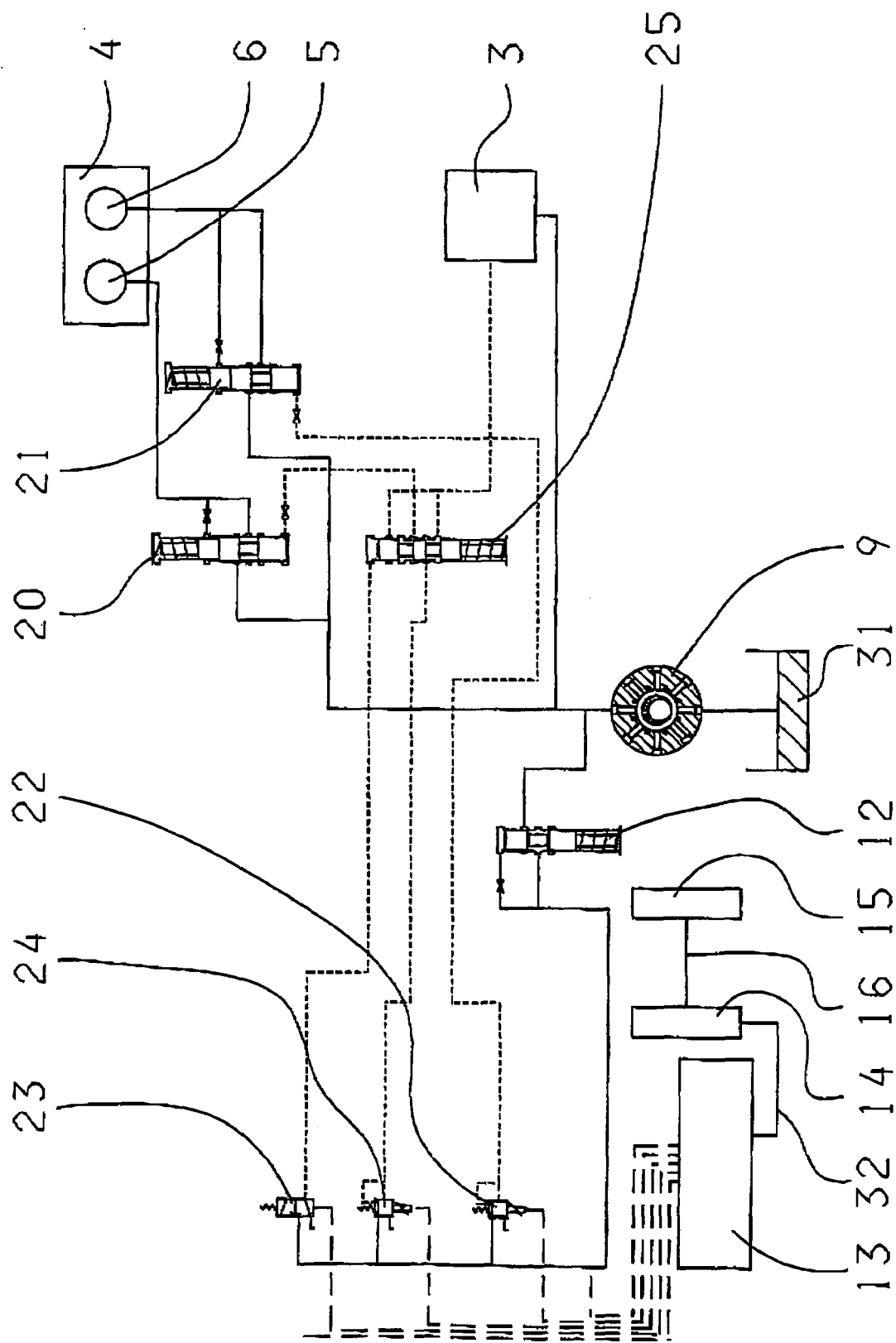
FIG. 6 is another hydraulic control system.

The embodiment shown in FIG. 6 corresponds in principle to the embodiment of FIG. 5, with the first pressure regulator valve 10 being replaced by a more cost-effective second solenoid valve 23. This is possible because for the fifth valve 20 a control pressure for a further consumer 3, preferably the hydraulic start-up element, is used. This hydraulic start-up element 3 is always completely open during reverse travel due to the low speeds that prevail in this gear R. With this a control pressure for a fifth pressure regulator valve 24, which controls the hydraulic start-up element 3, is not necessary during reverse travel and can thus control the fifth valve 20. As soon as the gear R is selected, a seventh valve 25 is switched over by way of the control pressure from the second solenoid valve 23, such that the control pressure of the fifth pressure regulator valve 24 controls the fifth valve 20. The dual use of the fifth pressure regulator valve 24 makes it possible for an overlapping shifting to be realized, as illustrated in FIG. 6, at nearly the same cost as the control system as illustrated in FIG. 1.

Figure 7:
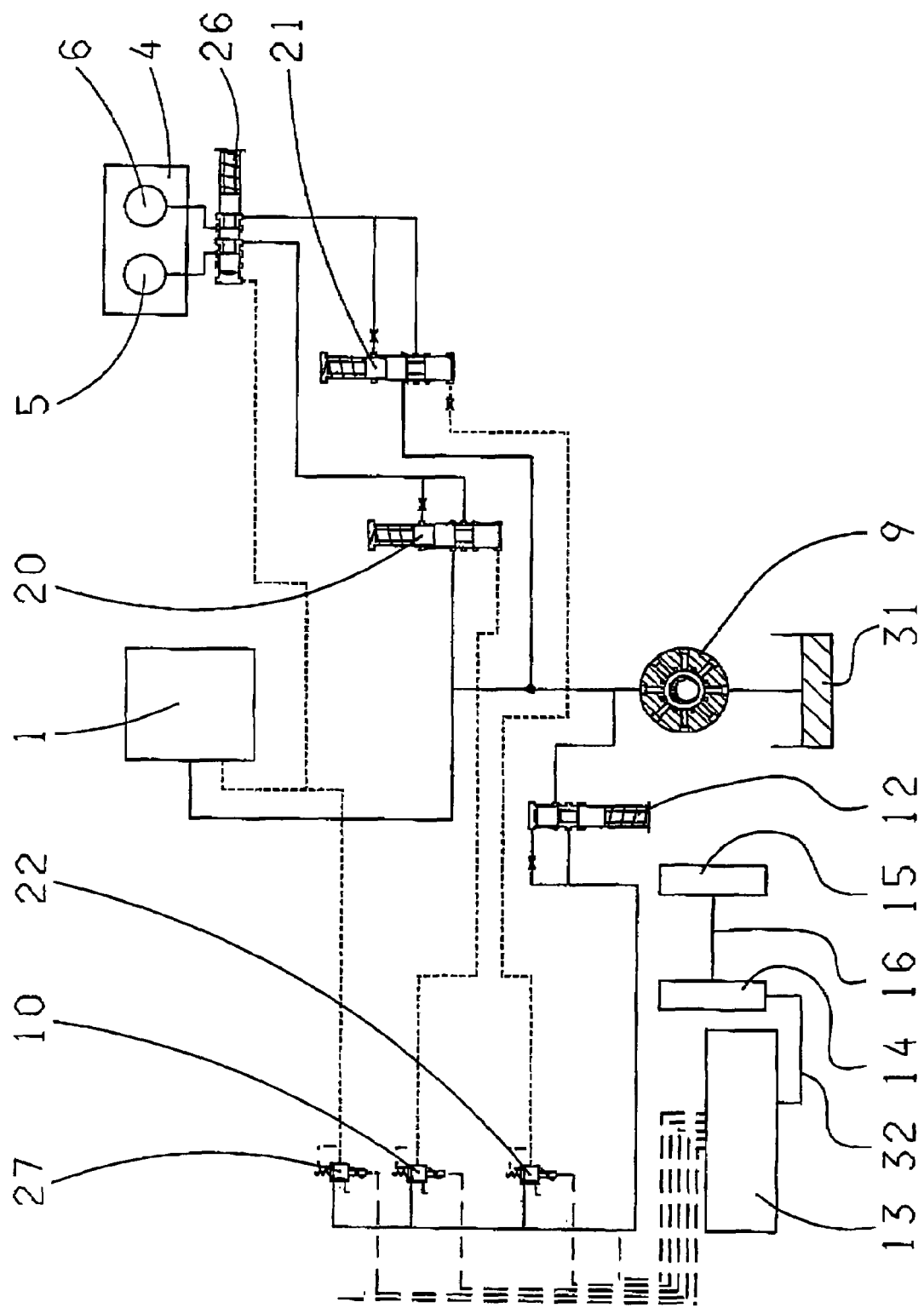
FIG. 7 is another hydraulic control system.

The embodiment shown in FIG. 7 also corresponds in principle to that in FIG. 5, wherein to further ensure the system against malfunctions an eighth valve 26 is used. This eighth valve 26 is a three-stage valve and is controlled via a sixth pressure regulator valve 27. The sixth pressure regulator valve 27 controls another consumer 1, which preferably corresponds to a V-pulley of a variable speed gear. Depending upon the level of the control pressure of the sixth pressure regulator valve 27, either the first or the second shifting component 5, 6 is pressurized or both shifting components 5, 6 are evacuated. The hydraulic control system is thereby once again protected against simple error, as with this arrangement an overlapping shifting is again possible.

Figure 8:
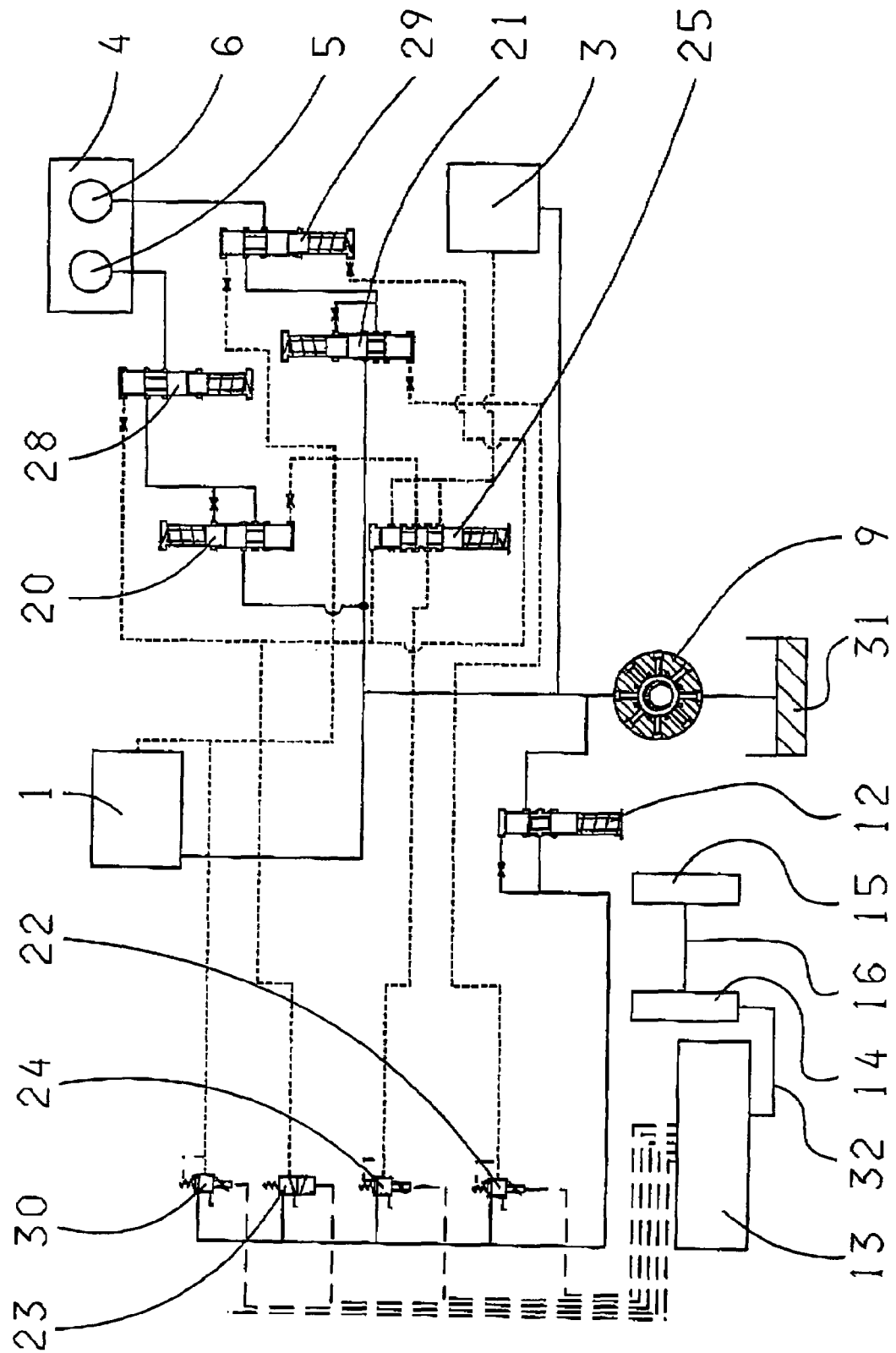
FIG. 8 is a still further embodiment of a hydraulic control system.

FIG. 8 illustrates an embodiment of a hydraulic control system as illustrated in FIG. 5, wherein for each shifting component 5, 6, an additional ninth and tenth valve 28, 29 is used. In this variation, the second solenoid valve 23 controls the ninth and tenth valves 28, 29, in addition to the seventh valve 25. Furthermore, the tenth valve 29 is controlled by a seventh pressure regulator valve 30. This seventh pressure regulator valve 30 also controls a further consumer 1, which advantageously corresponds to a V-pulley of a variable speed gear. In this manner, an overlapping shifting is made possible. The ninth and tenth valves 28, 29 could also be integrated into the firth and sixth valves 20, 21, which would naturally increase their overall length. The invention is described in connection with a CVT. However, it may just as easily be used for other automatic transmissions that comprise hydraulic clutches for controlling the direction of travel, such as stepped automatic transmissions.

REFERENCE NUMERALS 1 consumer
3 consumer or hydraulic start-up element
4 forward/reverse drive unit
5 first shifting component
6 second shifting component
7 first valve
8 second valve
9 pump
10 first pressure regulator valve
11 first solenoid valve
12 valve
13 electronic transmission control unit
14 control unit
15 gear selector device
16 non-mechanical connection
17 third valve
18 fourth valve
19 third pressure regulator valve
20 fifth valve
21 sixth valve
22 fourth pressure regulator valve
23 second solenoid valve
24 fifth pressure regulator valve
25 seventh valve
26 eighth valve
27 sixth pressure regulator valve
28 ninth valve
29 tenth valve
30 seventh pressure regulator valve
31 pressurized medium pan
32 non-mechanical connection
33 second pressure regulator valve
D forward gear
N neutral gear
R reverse gear

The invention claimed is:

1. A device for the hydraulic control of a continuously variable automatic transmission, comprising a forward/reverse drive unit (4), which is shifted by means of at least one first and one second shifting component (5, 6), the first and second shifting components (5, 6) are pressurized by means of at least two valves (7, 8, 17, 18, 20, 21) via a pressurized medium pump (9), and with a gear selector device (15), with which selection may be made among at least one forward gear (D), one neutral gear (N), and one reverse gear (R), and which is mechanically connected to a control unit (14), for selection of the gears, the control unit (14) possesses a non-mechanical connection (32) for actuation of the valves (7, 8, 17, 18, 20, 21), a first valve (7), which is pressurized with system pressure, is controlled via a first pressure regulator valve (10) and adjusts pressure with which the first and second shifting components (5, 6) are pressurized, along with at least one other valve (8, 17, 18) that selects which of the first and second shifting components (5, 6) will be pressurized with an output pressure of the first valve (7), the device further comprises a third and fourth valve (17,18) which are used to select whether the first and second shifting components (5, 6) that are connected in series in each case shall be pressurized with the output pressure of the first valve (7), the first shifting component is a brake which is pressurized via the third valve (17) and the second shifting component is a clutch which is pressurized via the fourth valve (18), and furthermore the fourth valve (18) is additionally controlled by means of a third pressure regulator valve (19), the third pressure regulator valve (19), which controls the fourth valve (18), also controls a consumer (1), and in that the third and fourth valves (17, 18) are controlled via a first solenoid valve (11).

2. The device according to claim 1, wherein the pressurized medium pump (9) forces pressurized medium directly onto at least a fifth and a sixth valve (20, 21), which are controlled by means of one of the first pressure regulator valve (10), a fourth or a fifth pressure regulator valve (22, 24), and the first and second shifting components (5, 6) pressurize the forward/reverse drive unit (4).

3. The device according to claim 2, wherein the is a brake, is pressurized in the reverse gear (R), and the is a clutch, is pressurized in the forward gear (D).

4. The device according to claim 3, wherein the fifth valve (20) is controlled by means of the fifth pressure regulator valve (24) only when the reverse gear (R) is selected, if a different gear is selected the fifth pressure regulator valve (24) controls another consumer (3) that represents the supply of pressure to a hydraulic start-up element, and the selection, which triggers said another consumer (3) of the fifth pressure regulator valve (24), is controlled via a seventh valve (25).

5. The device according to claim 4, wherein an eighth valve (26) is provided, which is positioned between the fifth or sixth valve (20, 21) and the first and second shifting components (5, 6), and which determines whether either one of the first and second shifting components (5, 6) will be pressurized, or both shifting components (5, 6) will be evacuated, the eighth valve (26) is controlled by means of a sixth pressure regulator valve (27).

6. The device according to claim 5, wherein the sixth pressure regulator valve (27) controls said consumer (1).

7. The device according to claim 6, wherein said consumer (1) corresponds to a V-pulley of a variable speed gear.

* * * * *